US005889747A

United States Patent [19]

Hisamatsu et al.

[11] Patent Number: 5,889,747

[45] Date of Patent: Mar. 30, 1999

[54] AUTOMATIC EDITING/RECORDING DEVICE AND DUBBING SYSTEM LOADED WITH THE DEVICE

[75] Inventors: Nobuaki Hisamatsu, Tokyo; Ryuichiro Togashi, Kanagawa; Hiroyuki Kikkoji, Tokyo, all of Japan

[73] Assignee: Sony Corporation, Tokyo, Japan

[21] Appl. No.: 923,006

[22] Filed: Sep. 3, 1997

Related U.S. Application Data

[62] Division of Ser. No. 640,453, May 1, 1996.

[30] Foreign Application Priority Data

May 11, 1995 [JP] Japan .................................... 7-135671

[51] Int. Cl.[6] ............................. G11B 3/64; G11B 27/02; G11B 5/86

[52] U.S. Cl. ................................ 369/84; 369/58; 360/13; 360/15

[58] Field of Search ................................. 369/47, 48, 49, 369/50, 54, 58, 83, 84, 85, 32; 360/13, 15, 31, 4

[56] References Cited

U.S. PATENT DOCUMENTS 5,070,419 12/1991 Kiyonaga .............................. 360/72.2
5,224,087 6/1993 Maeda et al. ............................ 369/54
5,243,587 9/1993 Itoh et al. ............................... 369/48
5,243,588 9/1993 Maeda et al. ............................ 369/54
5,291,467 3/1994 Ishiwata et al. ..................... 369/44.28
5,317,553 5/1994 Ohga et al. .............................. 369/54
5,331,617 7/1994 Fuma et al. .............................. 369/54
5,363,361 11/1994 Bakx ......................................... 369/54
5,418,762 5/1995 Kitayama ................................. 369/13
5,485,443 1/1996 Niwayama ............................... 369/54
5,532,992 7/1996 Funamoto ................................ 369/47
5,559,780 9/1996 Maeda et al. ............................ 369/54
5,563,861 10/1996 Kudo et al. .............................. 369/54
5,577,011 11/1996 Jung .......................................... 369/47
5,613,112 3/1997 Nagashima ........................... 369/32 X

FOREIGN PATENT DOCUMENTS

0196590 A3 10/1986 European Pat. Off. ........ G11B 11/10

*Primary Examiner*—Paul W. Huber
*Attorney, Agent, or Firm*—Limbach & Limbach L.L.P.

[57] ABSTRACT

The present invention provides a recording device and dubbing system, in which inputted information is sequentially recorded at a recording medium and only information determined to be desired by the user remains on the recording medium while information determined not to be desired by the user can be erased.

10 Claims, 10 Drawing Sheets

FIG. 2

| | 16bit | | 16bit | | |
|---|---|---|---|---|---|
| | MSB LSB | MSB LSB | MSB LSB | MSB LSB | |
| header | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | Cluster H | Cluster L | Sector(00h) | MODE(02h) | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker code | Model code | FIRST TNO | LAST TNO | 7 |
| | 00000000 | 00000000 | 00000000 | Used Sectors | 8 |
| | 00000000 | 00000000 | 00000000 | 00000000 | 9 |
| | 00000000 | 00000000 | 00000000 | Disc Serial No | 10 |
| corresponding table pointer data part | DISC | ID | P-DFA | P-EMPTY | 11 |
| | P-FRA | P-TNO1 | P-TNO2 | P-TNO3 | 12 |
| | P-TNO4 | P-TNO5 | P-TNO6 | P-TNO7 | 13 |
| | | | | | |
| | | | | | |
| | P-TNO248 | P-TNO249 | P-TNO250 | P-TNO251 | 74 |
| | P-TNO252 | P-TNO253 | P-TNO254 | P-TNO255 | 75 |
| | 00000000 | 00000000 | 00000000 | 00000000 | 76 |
| | 00000000 | 00000000 | 00000000 | 00000000 | 77 |
| management table (255 parts tables) (01h) | start address | | | track mode | 78 |
| | end address | | | link information | 79 |
| (02h) | start address | | | track mode | 80 |
| | end address | | | link information | 81 |
| (03h) | start address | | | track mode | 82 |
| | end address | | | link information | 83 |
| | | | | | |
| | | | | | |
| (FCh) | start address | | | track mode | 580 |
| | end address | | | link information | 581 |
| (FDh) | start address | | | track mode | 582 |
| | end address | | | link information | 583 |
| (FEh) | start address | | | track mode | 584 |
| | end address | | | link information | 585 |
| (FFh) | start address | | | track mode | 586 |
| | end address | | | link information | 587 |

U-TOC sector 0

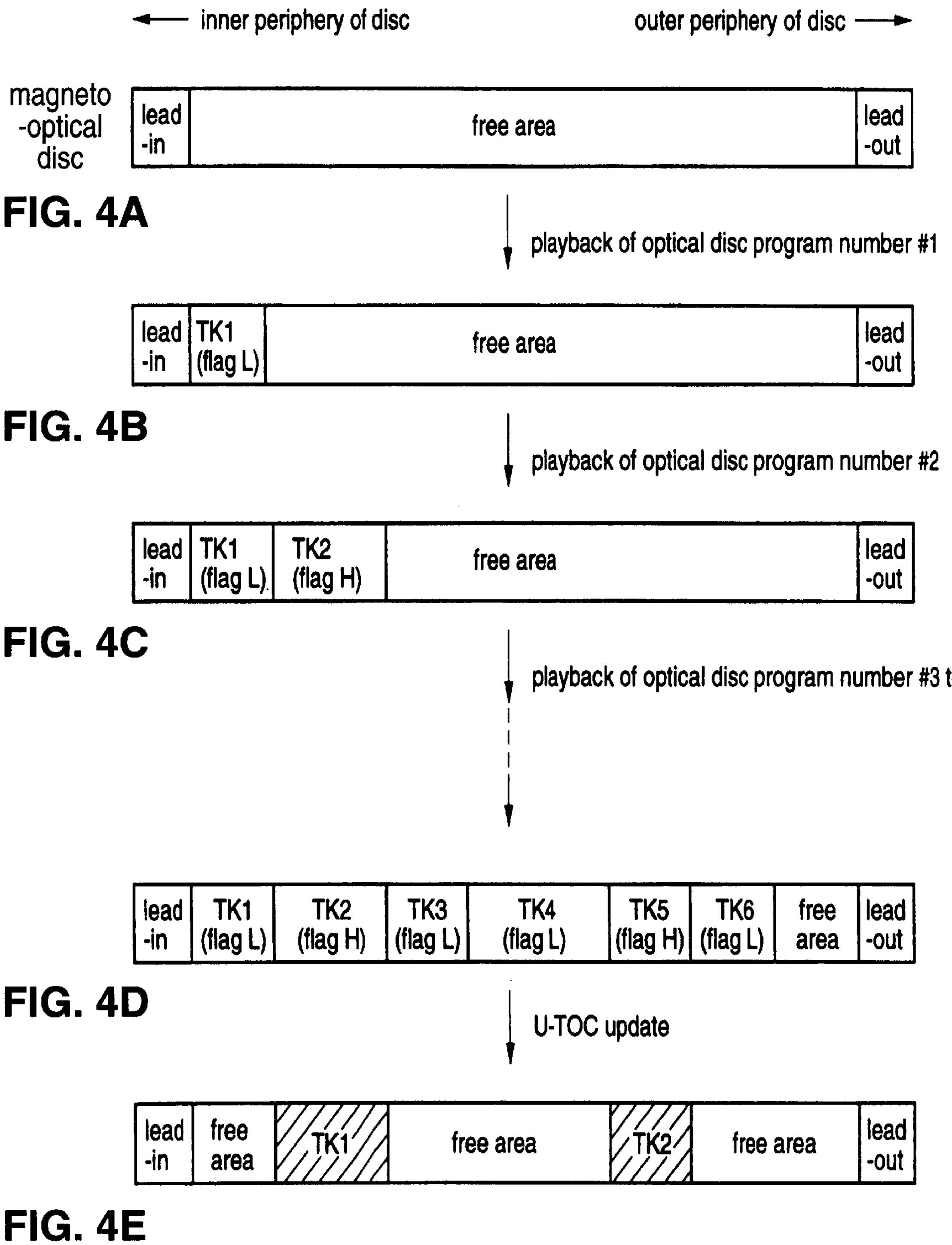
inner periphery of disc
outer periphery of disc
magneto -optical disc
lead -in
free area
lead -out
FIG. 4A
playback of optical disc program number #1
lead -in
TK1 (flag L)
free area
lead -out
FIG. 4B
playback of optical disc program number #2
lead -in
TK1 (flag L)
TK2 (flag H)
free area
lead -out
FIG. 4C
playback of optical disc program number #3 to #6
lead -in
TK1 (flag L)
TK2 (flag H)
TK3 (flag L)
TK4 (flag L)
TK5 (flag H)
TK6 (flag L)
free area
lead -out
FIG. 4D
U-TOC update
lead -in
free area
TK1
free area
TK2
free area
lead -out
FIG. 4E

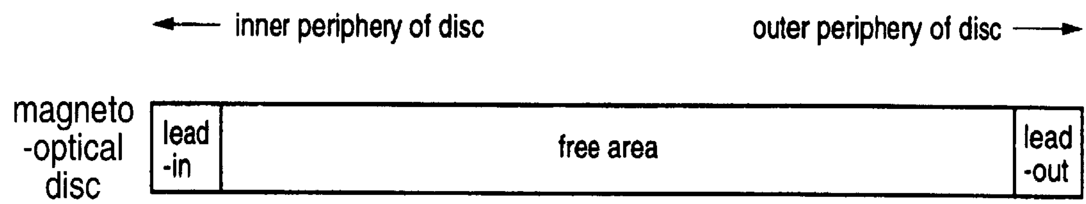
FIG. 7A
playing-back of optical disc program #1
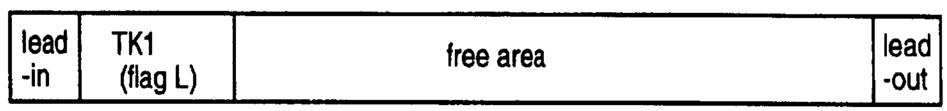
FIG. 7B
playing-back of optical disc program #2
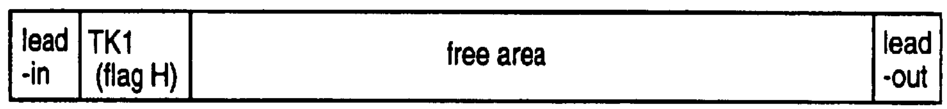
FIG. 7C
playing-back of optical disc program #3
| lead -in | TK1 | TK2 (flag H) | free area | lead -out |
|---|---|---|---|---|
FIG. 7D
playing-back of optical disc program number #4
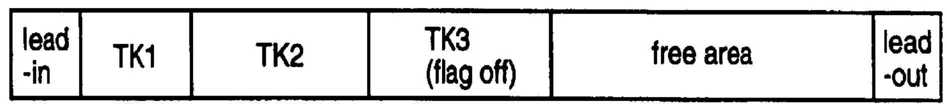
FIG. 7E
| lead -in | TK1 | TK2 | free area | lead -out |
|---|---|---|---|---|
FIG. 7F

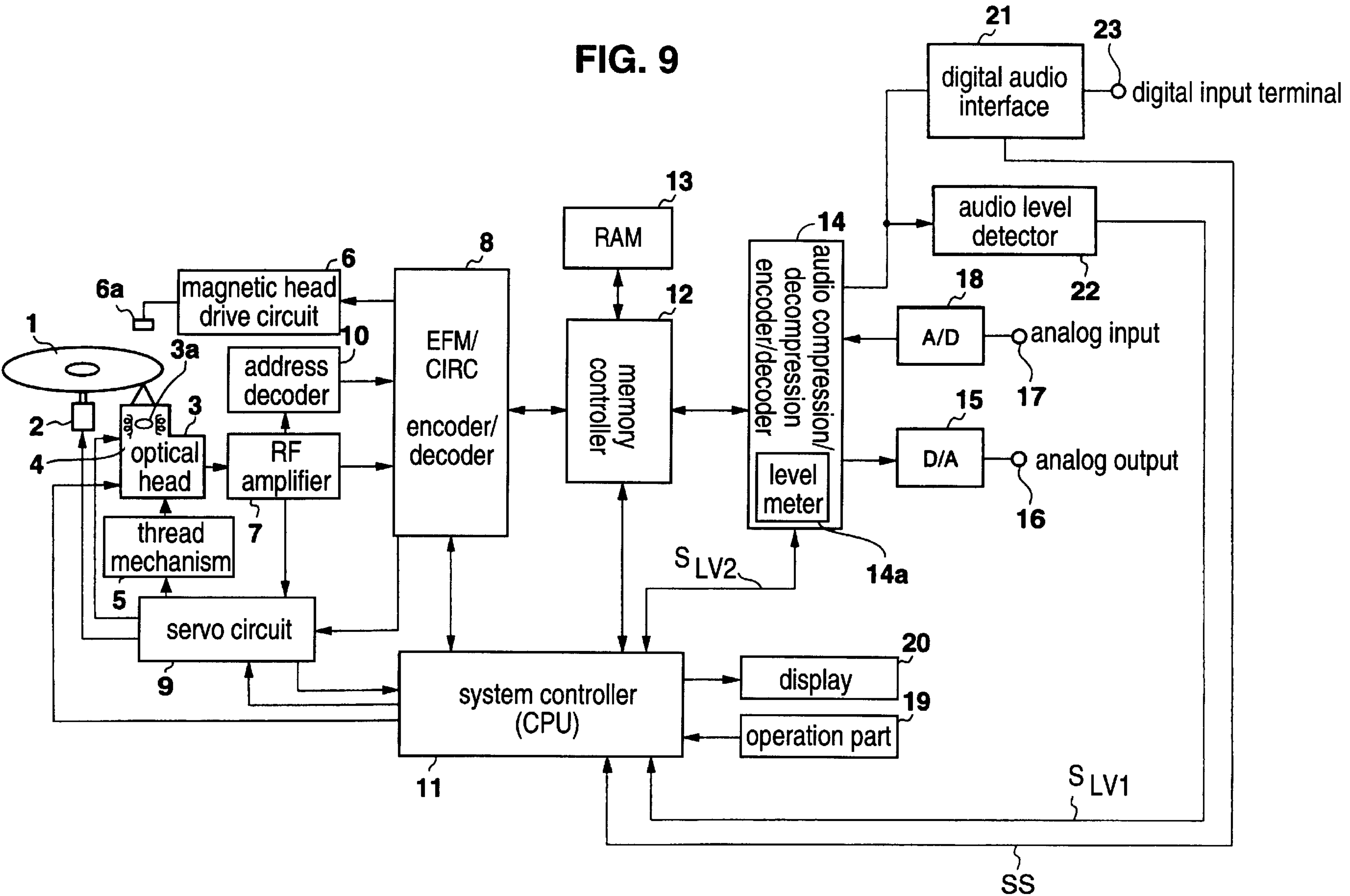
FIG. 9
digital audio interface
21
23
digital input terminal
audio level detector
22
14
audio compression/ decompression encoder/decoder
level meter
14a
A/D
18
analog input
17
D/A
15
analog output
16
RAM
13
memory controller
12
EFM/ CIRC encoder/ decoder
8
magnetic head drive circuit
6
6a
1
address decoder
10
3a
2
3
4
optical head
RF amplifier
7
thread mechanism
5
servo circuit
9
$S_{LV2}$
system controller (CPU)
11
display
20
operation part
19
$S_{LV1}$
SS 40
41
tuner
42
AGL /VOL
43
A/D
$T_{TU}$
$T_{MD}$
51
Vol
52
53
54
13
RAM
12
memory controller
8
EFM/ CIRC
encoder/ decoder
14
audio compression/ decompression encoder/decoder
level meter
14a
15
D/A
18
A/D
analog output
17
6a
6
magnetic head drive circuit
10
address decoder
1
3a
3
2
4
optical head
RF amplifier
7
thread mechanism
5
servo circuit
9
system controller (CPU)
11
20
display
19
operation part

AUTOMATIC EDITING/RECORDING DEVICE AND DUBBING SYSTEM LOADED WITH THE DEVICE

This is a divisional of application Ser. No. 08/640,453, filed May 1, 1996 from Japanese Priority Application No. P07-135671 filed May 11, 1995.

BACKGROUND OF THE INVENTION

The present invention relates to a recording device capable of recording prescribed information such as audio signals on a prescribed recording medium with every program unit thereof being discriminated.

Various recording devices using magnetic tape or magneto-optical tape etc. as a recording medium where a user is able to record audio signals such as music or image signals have become widespread. For example, in the case of audio signals, there is equipment employing magnetic tape such as compact cassette tape recorders or Digital Audio Tape ("DAT" (trademark)) recorders and equipment using magneto-optical discs such as magneto-optical disc recorders.

With these kinds of recording devices, for example, a compact disc player or the like is connected and music recorded on the compact disc (hereinafter referred to as "CD") is dubbed, or an air-check recording is carried out for a broadcast such as a radio broadcast.

Further, such devices are also well known where, for example, a compact disc player and a magneto-optical disc recorder are incorporated into a single piece of equipment so that a dubbing operation can be easily performed.

With the above dubbing operations and air-check recording the users themselves commonly edit and record programs they like on a recording medium such as a magneto-optical disc. In this way, by making discs and tapes having only favorite programs of the users assembled, the users' enjoyment can be dramatically increased.

However, this kind of work is very troublesome from the point of view of the user.

For example, when the user is listening to a program of a CD etc. and a program in favor with the user by chance begins to be played back and the user wishes to record this program to a magneto-optical disc, the user has to exert a complicated operation. The user must take the trouble to control the CD player to return the playback position to the leading position of the program the user would like to record and to go into a wait state with further recording preparation carried out in the magneto-optical disc recorder before releasing the wait state of the CD-player to commence playback timely along with further starting operation of the magneto-optical disc recorder for recording.

With regard to air-checks, only such programs as the user likes of the broadcasted programs can be recorded in the magneto-optical disc by recording the radio transmission within a time when recording is possible and by utilizing editing functions of the magneto-optical disc recorder, i.e. dividing or erasure etc. carried out on the data being recorded in program unit. This does, however, also involve troublesome editing processes.

As the present invention sets out to resolve these kinds of problems, the object of the present invention is to provide a recording device where just information units which the user desires are automatically recorded on a recording medium with the user having to perform almost no troublesome operations.

SUMMARY OF THE INVENTION

In order to resolve the aforementioned problems, according to the present invention, a recording device for recording information on a recording medium having a program region for recording inputted information and a management region for recording management information for managing the inputted information is provided which device comprises:

an information unit detector for detecting changes in information units of the inputted information;

a recording head for recording the inputted information at the program region and recording the management information at the management region;

a valid or invalid determining part for determining recording operation for each information unit detected by the information unit detector to be valid or invalid; and a management information editor for editing the management information in such a manner that only information units determined to be valid by the valid or invalid determining part are remained on the recording medium and information units determined to be invalid are erased from the recording medium. The management information edited at the management information editor is recorded at the management region of the recording medium.

Further, according to the present invention, a dubbing system for reproducing information reproduced from a first recording medium at a second recording medium is provided which system comprises:

an information unit detector for detecting changes in information units of information reproduced from the first recording medium;

a recording head for recording on the second recording medium management information for managing information reproduced from the first recording medium and information recorded at the second recording medium;

a valid or invalid determining part for determining the recording operation for each information unit detected by the information unit detector to be valid or invalid; and a management information editor for editing the management information in such a manner that only information units determined to be valid by the valid or invalid determining part are remained on the second recording medium and information units determined to be invalid are erased from the second recording medium. The management information edited at the management information editor is recorded at the second recording medium management region.

According to the recording device of the present invention, while certain information is being inputted, this information is recorded in preparation on a recording medium, with the user's setting operation during recording to determine units of this information to be valid or invalid as recording data. Then, a recording medium can be obtained on which only such information units as the user likes are remained by only leaving information units determined to be valid on the recording medium (with information determined to be invalid being erased after recording).

BRIEF DESCRIPTION OF THE DRAWINGS

FIG. 2 is a view showing the data structure of the management region in the recording medium according to the present invention;

FIG. 4A is a schematic view showing a virgin disc as a recording medium according to the present invention;

FIG. 4B is a schematic view showing the recording medium with of a first program not requested by a user being recorded;

FIG. 4C is a schematic view showing the recording medium with a second program requested by a user being recorded;

FIG. 4D is a schematic view showing the recording medium with programs 1 to 6 being recorded including programs not requested by a user;

FIG. 4E is a schematic view showing the recording medium having edited program numbers with programs not requested by the user being erased;

FIG. 7A shows a schematic view showing a virgin disc as a recording medium according to the present invention;

FIG. 7B is a schematic view showing the recording medium with a first program not requested by the user being recorded;

FIG. 7C is a schematic view showing the recording medium overwritten with a second program requested by the user;

FIG. 7D is a schematic view showing the recording medium with a third program desired by the user being recorded;

FIG. 7E is a schematic view showing the recording medium with a fourth program not requested by the user being recorded;

FIG. 7F shows a schematic view showing the recording medium with the fourth program not requested by the user being erased and the program numbers being edited;

FIG. 9 is a block diagram showing the whole of the second embodiment of the present invention.

DETAILED DESCRIPTION OF THE PREFERRED EMBODIMENT

The following is a description of the embodiments of the present invention. In each embodiment, a description is given taking an example where a magneto-optical disc recording device employing a magneto-optical disc is taken as the recording device. This description is given in the following sequence.

1. Structure of the magneto-optical disc recording device for a first embodiment.
2. U-TOC (User-Table of Contents) Sector.
3. Example of a first recording method adoptable in the embodiments.
4. Example of a second recording method adoptable in the embodiments.
5. Structure and operation of magneto-optical recording device as a second embodiment.

6. Structure and operation of magneto-optical recording device as a third embodiment.
7. Examples of various modifications.

1. Structure of the magneto-optical disc recording device as the first embodiment.

Figure 1:
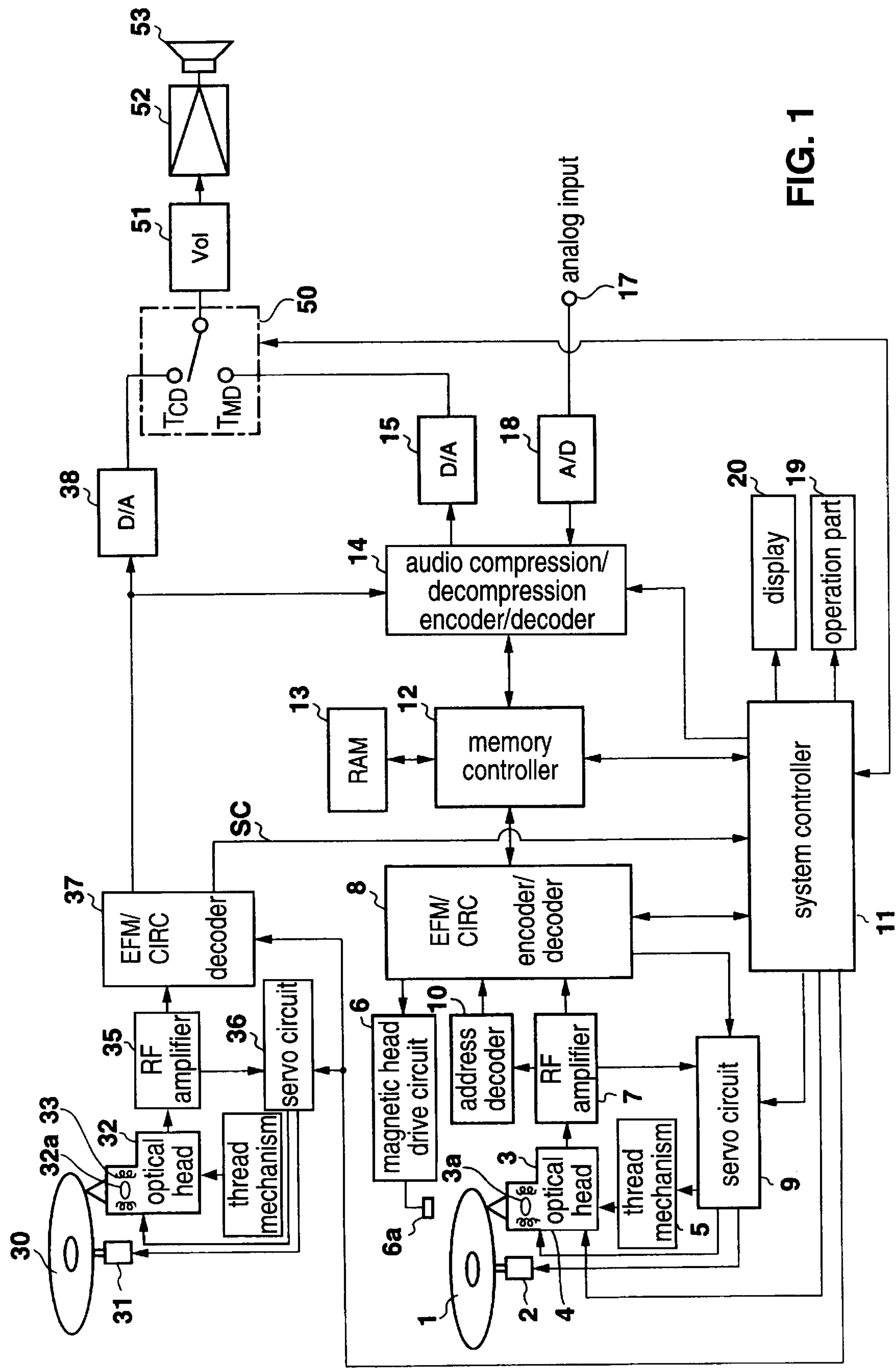
FIG. 1 is a block diagram showing the whole of a first embodiment of the present invention.

FIG. 1 shows a block diagram of the essential parts of a recording/playback device using a magneto-optical disc 1 as a recording medium, which is the magneto-optical disc recording device of the first embodiment.

In the case of this embodiment, a block diagram is shown so as to illustrate a composite device where an optical disc playback device is also provided as well as the magneto-optical disc recording device.

In FIG. 1, the magneto-optical disc 1 is used as the media for recording the audio data and is rotatably driven by a spindle motor 2 during recording and playback. An optical head 3 operates as a head for recording and playback by illuminating the magneto-optical disc 1 with laser light during recording and playback. Namely, a high-level laser is outputted during recording and a relatively low level laser beam is outputted for reading data by detecting change in reflected light due to the magnetic Kerr effect at the time of playback.

The optical head 3 has a built-in optical system comprising a laser diode as a laser output means, a polarizing beam splitter and an object lens etc., and a detector for detecting reflected light. The object lens **3*a* is elastically supported by a twin-axial mechanism 4 in a direction across the radius of and in a direction towards and away from the magneto-optical disc 1. The whole of the optical head 3 can also be shifted in a direction across the radius of the magneto-optical disc 1 by a thread mechanism 5**.

Further, a magnetic head 6a is positioned opposite to the optical head 3 so as to sandwich the magneto-optical disc 1 for applying a magnetic field modulated in accordance with provided information to the magneto-optical disc 1.

The magnetic head 6a can be shifted in a direction across the radius of the magneto-optical disc 1 together with the optical head 3 by the thread mechanism 5.

Information read from the magneto-optical disc 1 by the optical head 3 as a result of the playback operation is provided to an RF amplifier 7. The RF amplifier 7 extracts an RF playback signal, a tracking error signal, a focus error signal and groove information (absolute position information recorded on the magneto-optical disc as pre-groove (wobbling groove) etc. by performing arithmetic processes on the provided information. The extracted RF playback signal is provided to an encorder/decorder 8. Further, the tracking error signal and the focus error signal are provided to a servo circuit 9. The groove information is provided to an address decoder 10 and demodulated. Address information decoded from the groove information and address information recorded as data and decoded at a first encoder/decoder 8 is provided to a system controller 11 comprising a microcomputer.

The servo circuit 9 generates various servo drive signals, for which the tracking error signal and focus error signal provided and the track jump instruction, access instruction and rotational velocity detection information etc. from a system controller 11 are used, for controlling the twin-axial mechanism 4 and the thread mechanism 5 so as to perform focusing and tracking controls and controlling the spindle motor 2 so as to perform a Constant Linear Velocity (CLV) control thereof.

The RF playback signal is decoded at the first encoder/decoder 8 using Eight Fourteen Demodulation (hereinafter referred to as "EFM demodulation") or Cross-Interleaved Reed-Solomon Coding (hereinafter referred to as "CIRC") etc., before being temporarily written to a buffer memory 13 by a memory controller 12. The reading out of data from the magneto-optical disc 1 by the optical head 3 and the transferring of the played-back data from the optical head 3 to the buffer memory 13 is carried out at a transfer rate of 1.41 Mbits/sec.

Data written in the buffer memory 13 is read-out at a playback data transmission rate of 0.3 Mbits/sec and provided to a second encoder/decoder 14. Then, playback signal processing such as expansion processing etc. is carried out for audio data compressed using a Modified Discrete Cosine Transfer (hereinafter referred to as "MDCT") and the data is then converted to an analog signal by a Digital to Analog (hereinafter referred to as "D/A") converter 15. Analog audio signals from the D/A converter 15 are then provided to the terminal TMD of an output switch 50.

When the magneto-optical disc 1 is played back, the system controller 11 controls the output switch 50 so as to make connection to the terminal TMD so that the audio playback signal from the magneto-optical disc 1 is provided to a speaker 53 via a volume control circuit 51 and an amplifier 52, to be provided as an audio output.

While the recording operation using analog transmission is being executed for the magneto-optical disc 1, an analog audio signal from external equipment such as a microphone, CD player, or tape player, or another magneto-optical disc player etc. is provided to an analog input terminal 17.

The recording signal (analog audio signal) provided to the analog input terminal 17 is sampled at 44.1 kHz and converted to 16-bit quantized digital data at the A/D converter 18. This digital data is provided to the second encoder/decoder 14 and undergoes audio compression encoding. Namely, the signal is compressed to about one fifth of the original amount of data using an MDCT process.

Recording data compressed at the second encoder/decoder 14 is then temporarily written to the buffer memory 13 and read out at a prescribed timing to be sent to the first encorder/decoder 8 by means of the memory controller 12.

The data is then provided to a magnetic head drive circuit 6 after being encoded using CIRC or EFM encoding at the first encoder/decoder 8.

The magnetic head drive circuit 6 then provides a magnetic head drive signal corresponding to the encoded recording data to the magnetic head 6*a*. Namely, a magnetic field is applied to the magneto-optical disc by using a north pole or south pole of the magnetic head 6*a*. Further, at this time, the system controller 11 provides a control signal to the optical head 3 so that high-output recording level laser light is outputted.

An optical disc 30 is rotatably driven during playback at a constant linear velocity by a spindle motor 31. Data recorded in pit shapes on the optical disc 30 is then read by a second optical head 32 and sent to an RF amplifier 35. At the second optical head 32, an objective lens 32*a* is supported by a twin-axial mechanism 33 and can be forcibly displaced by an elastic force in the tracking and focus directions.

Further, the second optical head 32 can also be shifted radially across the optical disc 30 by a thread mechanism 34.

At the RF amplifier 35, a focus error signal and a tracking error signal are generated as well as the RF playback signal and these error signals are provided to a servo circuit 36. The servo circuit 36 then generates various drive signals, i.e. the focus drive signal, the tracking drive signal, the thread drive signal and the spindle drive signal, from the focus error signal and the tracking error signal and controls the operation of the twin-axial mechanism 33, the thread mechanism 34 and a spindle motor 31.

The RF playback signal is provided to a decoder 37. At the decoder 37, information read from the optical disc 30 is converted into 16-bit quantized digital audio data sampled at 44.1 kHz by carrying out EFM demodulation or CIRC decoding.

Further, at the decoder 37, control data SC such as TOC (Table of Contents) and sub-codes are also extracted and these are provided to the system controller 11 and used for various controls.

Digital audio data outputted from the decoder 37 is made into an analog audio signal at a D/A converter 38 and provided to a terminal TCD of the output switch 50.

At the time of playback the CD, the audio playback or reproduced signal from the optical disc 30 is provided to the speaker 53 via the volume control circuit 51 and the amplifier 52 to be outputted as an audio output because the system controller 11 causes the output switch 50 to select the terminal TCD.

The output of the decoder 37 is also provided to the second encoder/decoder 14. The audio data played-back or reproduced from the optical disc 30 can therefore be dubbed onto the magneto-optical disc 1 by playing-back from the optical disc 30 and recording to the magneto-optical disc 1 simultaneously.

The operation part 19 is provided with a recording key, a playback key, a pause key, an Automatic Music Sensor (hereinafter referred to as "AMS") key and a search key, etc. for the user carrying out various operations such as playing-back the optical disc 30 or recording to or playback from the magneto-optical disc 1.

In this embodiment, a collection key is provided as the operation key for carrying out the collection mode operation that will be described later.

The system controller 11 executes each of the control operations for each part in accordance with operation information from the operation part 19 and an operation program stored in an internal ROM, and also carries out the magneto-optical disc playback operation, the magneto-optical disc recording operation and the optical disc playback operation, etc.

At a display 20, when the magneto-optical disc 1 or the optical disc 30 is playing, various displays i.e. time information such as the total playing time and running time during playback and recording etc., the program number, operating conditions and operating modes etc. are displayed under the control of the system controller 11.

2. U-TOC Sector

When recording-to and playing-back from the magneto-optical disc 1, it is necessary to read management information, i.e. a Pre-mastered Table of Contents (hereinafter referred to as "P-TOC") and a User Table of Contents (hereinafter referred to as "U-TOC"), recorded on the magneto-optical disc 1. The system controller 11 then determines the address of the area on the magneto-optical disc 1 which data is to be recorded and the address of the area on the magneto-optical disc 1 from which data is to be played back in accordance with this management information. This management information is held in the buffer memory 13. The buffer memory 13 is therefore divided-up into a buffer area for storing recording data or playback data while recording-to or playing-back from the magneto-optical disc and an area for holding information of the P-TOC and the U-TOC.

The system controller 11 then reads this management information out when the magneto-optical disc 1 is loaded by carrying out a playback operation for the inner-most periphery of the disc which is pre-recorded with the management information and pre-storing this information in the temporary buffer memory 13. This information is then referred to during subsequent recording and playback operations for the magneto-optical disc 1.

The U-TOC can be edited and re-written in response to the recording and erasing of data. The system controller 11 carries out these editing processes on U-TOC information stored in the buffer memory 13 for the recording and erasing operations for the magneto-optical disc 1 and re-writing of the U-TOC area on the magneto-optical disc 1 is also carried out at a prescribed timing in response to this re-writing operation.

Here, a description is given of the U-TOC sector taken as the management information for managing recording and playback operations of programs at the magneto-optical disc 1.

In addition to U-TOC information, Pre-mastered Table Of Contents information (hereinafter referred to as "P-TOC" information) is also provided as TOC information. This P-TOC information is formed at a pit area at the innermost periphery of the magneto-optical disc and is read-only information. The P-TOC is used for carrying out management of the position etc. of the recordable area (recordable user area), read-out area and U-TOC area of the disc. The magneto-optical disc system is formed to be also capable of playing-back read-only-memory optical discs where all data is recorded in pit-shapes. However, in the case of the read-only-memory discs, only the P-TOC is provided as program management information recorded in a form of Read-Only Memory (hereinafter referred to as "ROM") and the U-TOC is not formed.

A detailed description of the P-TOC is therefore omitted and a description of the U-TOC will be given which can be provided at a recordable magneto-optical disc.

FIG. 2 shows the format of a U-TOC sector 0.

Here, sector 0 to sector 7 can be provided as a U-TOC sector, with sector 1 and sector 4 being for character information and sector 2 being an area for recording the date and hour of recording. Here, a description is given only with regards to the U-TOC sector 0 necessary for the recording to and playing-back from the magneto-optical disc 1.

The U-TOC sector 0 is recorded with management information mainly for managing programs already recorded by the user and free areas (recordable areas) that can be recorded with new programs.

For example, while a prescribed program is being recorded on the magneto-optical disc, the system controller 11 searches for a free area on the disc from the U-TOC sector 0 and records audio data on the searched out free-area. Further, during playback, the area recorded with the program to be played-back is determined from the U-TOC sector 0, with this area then being accessed and played back.

The data region (4 bytes×588, =2352 bytes) for the U-TOC sector 0 has the leading position being recorded with a synchronization pattern formed with rows of single-byte data of all zeros or all ones.

Four bytes consisting of an address comprising a cluster address (Cluster H) (Cluster L) and a sector address (Sector) and mode information (Mode) are then added to make-up the header.

A sector comprises 2342 bytes, with 36 sectors being one unit for making-up one cluster. The address may be recorded in this single sector unit also in a P-TOC sector or a sector recorded with actual audio data without being limited to this U-TOC sector 0.

The cluster address is written using two bytes, an upper address (Cluster H) and a lower address (Cluster L) and the sector address (Sector) is written using one byte.

After this, data is recorded at a prescribed byte position for a maker code, a model code, a First TNO indicating a first program number, a last TNO indicating a last TNO, used sectors, disc serial number and disc ID etc.

Further, a region recorded with various table pointers (P-DFA, P-EMPTY, P-FRA, P-TN01 to P-TN0255) is prepared as a corresponding table pointer data section, which is a region for data for making programs already recorded by the user or free areas etc. correspond to management tables data in a management tables section to be described later.

The management tables section is provided with 255 parts tables from (01h) to (FFh) as management tables corresponding to the table pointers (p-DFA to P-TN0255). Each of the parts tables is then recorded with a start address which is the starting point of a part, an end address that is the end point, and mode information (track mode) for this part. Further, for cases where parts designated in each parts table can be continuously linked to other parts, link information can also be recorded which designates the parts table recorded with the start address and end address of the parts to be linked.

In this application, numerical values with the suffix "h" are expressed in hexadecimal. Further "the part" is defined as a portion of a single program in which portion data continues with respect to time is recorded in a physically continuous manner.

At the magneto-optical disc system, even if a single item of program data is recorded in a physically discontinuous manner, that is, recorded in a plurality of parts in a randomly dispersed manner, the program data is played back with each of the parts being accessed in order and the playback operation is performed without causing any trouble. Therefore, with regards to user-recorded programs, they are sometimes divided into a plurality of parts and recorded for the purpose of effectively using the recordable area.

In order to link a plurality of the divided parts, link information is provided at the parts tables corresponding to each of the parts. The parts tables can then be linked by designating the parts table to be linked using, for example, numbers (01h) to (FFh) given to each of the parts tables.

At the management tables section of the U-TOC sector 0, one parts is managed by one parts table. For example, a program recorded with three parts into which the program is divided is managed by three parts tables linked by link information.

In reality, the link information is expressed using a numeric value taken as the byte position within the U-TOC sector by employing a prescribed arithmetic process, i.e. the parts table is designated as being positioned at the 304+(link information)×8th byte.

Each of the parts tables (01h) to (FFh) at the management tables section of the U-TOC sector 0 show the contents of these parts using the table pointers (P-DFA, P-EMPTY, P-FRA, P-TN01 to P-TN0255) at the corresponding table pointing data section.

A table pointer P-DFA (Pointer for Defective Area) indicates a defective area on the magneto-optical disc 1 and designates one parts table or a parts table at the head of a plurality of parts tables which represents an area that is defective due to scratches or fingerprints. Namely, when a defective part exists, any one of (01h) to (FFh) is recorded as the table pointer P-DFA, with the start address and end address of the defective part being recorded at the corresponding parts table. Further, when other defective parts exist, another parts table is designated as link information in the parts table for the former defective and information on the latter defective part is therefore also indicated by the latter parts table. Moreover, when there are no other defective parts, link information is, for example, taken as being "00h" and it is thereafter taken that there are no links.

The table pointer P-EMPTY (Pointer for Empty Slot) indicates one parts table or a leading parts table of a plurality of un-used parts tables in the management tables section. When an un-used parts table exists, any of (01h) to (FFh) is recorded as the table pointer P-EMPTY. When there is a plurality of un-used parts tables, these un-used parts tables are designated sequentially using link information from the parts table first designated by the table pointer P-EMPTY and all of the un-used parts tables are linked on the management tables section.

The table pointer P-FRA (Pointer for Freely Recordable Area) indicates free areas (including erased regions) on the magneto-optical disc 1 on which the writing of data is possible and one parts table or a leading parts table of a plurality of parts tables is designated in which the parts portion which comprises the free area is indicated. Namely, when a free area exists, any one of (01h) to (FFh) is recorded as the table pointer P-FRA and the start and end addresses of the part of the free area are recorded at the parts table corresponding to the table pointer. Further, when there is a plurality of the parts tables for the free areas, they are designated sequentially by using link information until the link information becomes "(00h)".

Figure 3:
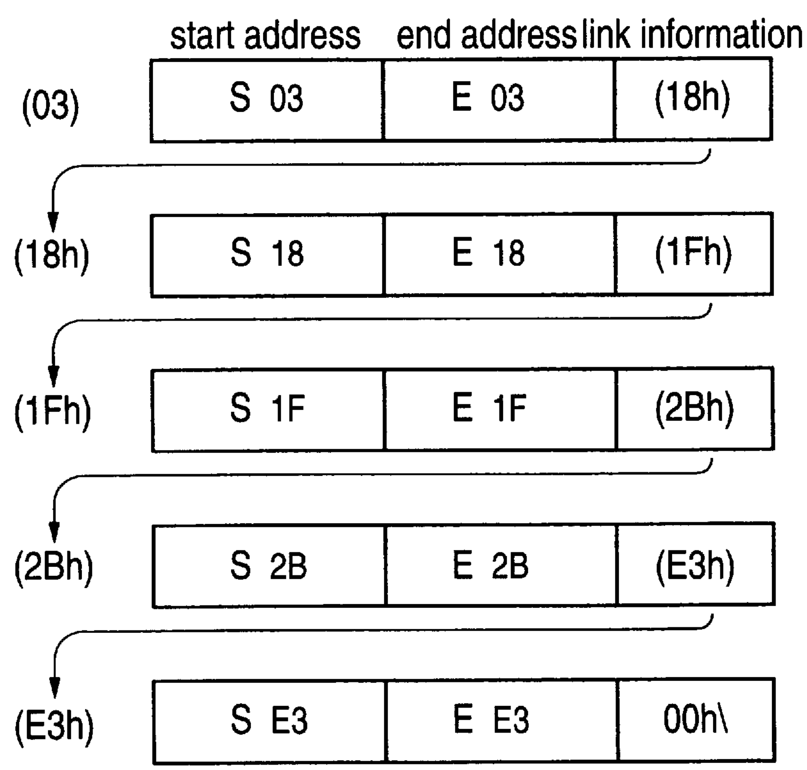
FIG. 3 is a view showing the linked parts tables in the management region.

FIG. 3 is a schematic view showing an example of parts taken as a free area managed using a parts table. Here, when the parts (03h) (18h) (1Fh) (2Bh) and (E2h) are taken as a free area, the part (03h) at the head of the area is first designated by the corresponding data pointer P-FRA. The conditions of the free areas are then shown to be expressed by the link information for the parts tables (03h) (18h) (1Fh) (2Bh) and (E2h) designated using the link information (18h) (1Fh) (2Bh) and (E2h) that follows (03h). The management conditions for the aforementioned defective areas and un-used parts tables are similar.

If a magneto-optical disc is not recorded with any audio data of program at all and has no defects, then the parts table (01h) is designated by the table pointer P-FRA. In this way, the whole of the recordable user area of the disc is shown to be a free area. Because the remaining parts tables (02h) to (FFh) are not used in this case, linking is carried out so that the parts table (02h) is designated by the table pointer P-EMPTY and the parts table (03h) is designated by the link information for the parts table (02h), with this being repeated until the parts table (FFh) is reached. The link information for the parts table (FFh) in this case is given as "00h" so as to show that there are no subsequent links.

With regards to the parts table (01h) at this time, a recordable user area start address is recorded as the start address and the address directly before the read-out start address is recorded as the end address.

The table pointers P-TN01 to P-TN0255 respectively designate parts of programs recorded by the user on the magneto-optical disc 1. For example, the table pointer P-TN01 designates a parts table indicating one part or a part physically heading a plurality of parts at which the data for the first program is recorded.

For example, when the first program is recorded without being divided into a plurality of parts on the disc, that is, recorded in a single part, the recording region of the first program is recorded as the start and end addresses at the parts table indicated by the table pointer P-TN01 and "(00h)" is recorded as link information.

When, for example, the second program is recorded as a plurality of parts on the disc in a randomly dispersed manner, each of the parts are designated in sequence with respect to time in order to indicate the positions for recording the second program. Namely, the parts tables are linked from the parts table designated by the table pointer P-TN02 to the parts table of link information "(00h)" by designating next parts tables with link information in accordance with a time sequence (similar form as for FIG. 3 above).

In this way, for example, by recording data of all of the parts, at which data comprising the second program is recorded, so that the parts are sequentially designated, the data of the U-TOC section 0 is used, while playing-back the second program or overwriting data to the region for the second program, to allow the optical head 3 or the magnetic head **6*a*** to access the designated parts to, in turn, permit either the continues taking out of audio information from randomly dispersed parts or recording for which the recording area is effectively utilized.

Because the U-TOC sector 0 is configured in the above way, address management for recording and playback operations of the magneto-optical disc 1 becomes possible. Further, program division, program linking, program erasing and program number substitution is possible by updating only this U-TOC sector-0.

3. Example of a first recording method adoptable in the first embodiment.

An example of the recording operation that is fundamental to the present invention realized by the embodiment of FIG. 1 is described in the following. There are various possibilities which may be considered for the actual operation but in this specification two recording methods are given. Here, a description of a first recording method will be given first.

The recording operation that is made possible in this embodiment is that which records automatically an audio playback signal from the optical disc 30 on the magneto-optical disc 1 under the control of the system controller 11 while the optical disc 30 is being played-back.

It is therefore only necessary for the user simply to recognize that the optical disc 30 is being played-back and the user may, in particular, not be aware of the recording operation of the magneto-optical disc 1.

And by a simple operation of the user listening to the programs played back or reproduced at the optical disc 30 just pressing the collection key whenever a played back program is by chance in the user's favor, the favorite programs with the user can be finally collected to be recorded at the magneto-optical disc 1 until every optical disc 30 finishes playing-back.

In this description, we let this operating mode be referred to as the collection mode.

For example, an example of a collection mode operation for the case where a single optical disc is played-back from a first program (track #1) to a sixth program (track #6) is shown in FIG. 4A to FIG. 4E.

First, the installed magneto-optical disc 1 is taken as a virgin disc which is not recorded with any programs, as in FIG. 4A.

The user then carries out the optical disc playback operation and obtains program number 1 from the optical disc 30 as audio playback data, which is then outputted from the speaker 53 in the way described above, as well as being provided to the second encoder/decoder 14.

During collection mode, the system controller 11 executes the recording operation with respect to the magneto-optical disc 1 automatically in line with the playing-back of the optical disc 30.

As a result of this, audio data is recorded at the magneto-optical disc 1 as the first program TK1 as shown in FIG. 4B at the time when playback of program number #1 is completed at the optical disc 30.

During recording of the program, the system controller 11 monitors whether or not there has been a collection key operation at the operation part 19. When there has been the key operation, a process is carried out to put the collection flag corresponding to the track within this recording to "on".

If the user does not operate the collection key during the period for listening to the track #1 of the optical disc 30, the collection flag is remained in "L" (off) which flag is set at the internal register etc. by the system controller 11 in correspondence with the first program TK1 on the magneto-optical disc 1 as shown in FIG. 4B.

The playing-back of the optical disc 30 then proceeds to program number #2, and the second program TK2 is recorded on the magneto-optical disc 1 in the way shown in FIG. 4C at the time when playback of the program number #2 is completed. Then, if the user operates the collection key during the playing-back of program number #2, the system controller 11 sets the collection flag to "H" (on) in correspondence to the second program TK2.

Similarly, in the following, the third program TK3 to the sixth program TK6 are recorded so as to follow the playing-back of program number #3 to program number #6 at the optical disc 30. However, collection flags are set to be on or off so as to correspond with each of the recorded tracks in accordance with whether or not the user has pushed a collection key during the playing-back of each of the programs.

For example, for the playback operation completed at a time when the playback of program #6 is completed at the optical disc 30, recording has been carried out on the magneto-optical disc 1 up to the sixth program TK6, as shown in FIG. 4D.

The system controller 11 checks the collection flags corresponding to each program so as to leave only the programs for which the collection flag is "on" with other programs being erased.

Namely, only programs for which the collection flag is "on" are managed on the U-TOC data, with the remaining programs being erased so as to-be updated as free areas.

When the user presses the collection key during playback of programs #2 and #5 of the optical disc 30, the state of the magneto-optical disc 1 is such that the programs #2 and #5 taken as the playback data are recorded as the first program TK1 and the second program TK2 on the magneto-optical disc 1, as shown in FIG. 4E.

Namely, if, while the optical disc 30 is being played-back, the user is by chance in favor with a program and presses the collection key, this program is remained so as to be recorded on the magneto-optical disc 1.

If, for example, the magneto-optical disc 1 in the state shown in FIG. 4E is remained to be installed in the apparatus and another optical disc 30 is played-back in collection mode, recording will similarly be carried out at the free areas, and only programs designated using the collection key will be recorded.

Therefore, for example, while a number of optical discs are being played-back during daily life, simple operations of the user pressing the collection key whenever a program is by chance in the user's favor will results in making a magneto-optical disc 1 recorded only with programs in the user's favor after a number of days.

Figure 5:
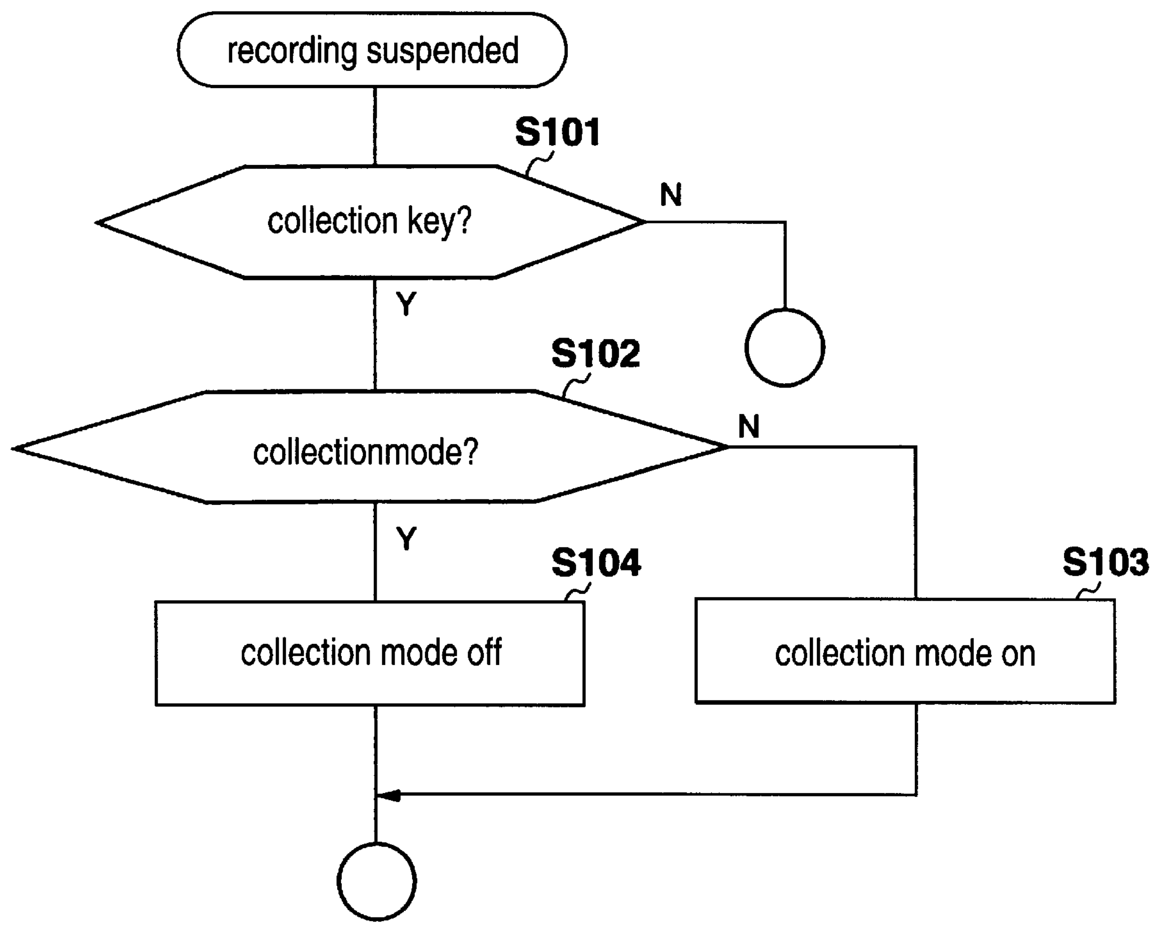
FIG. 5 is a flowchart showing a collection mode selection operation.
Figure 6:
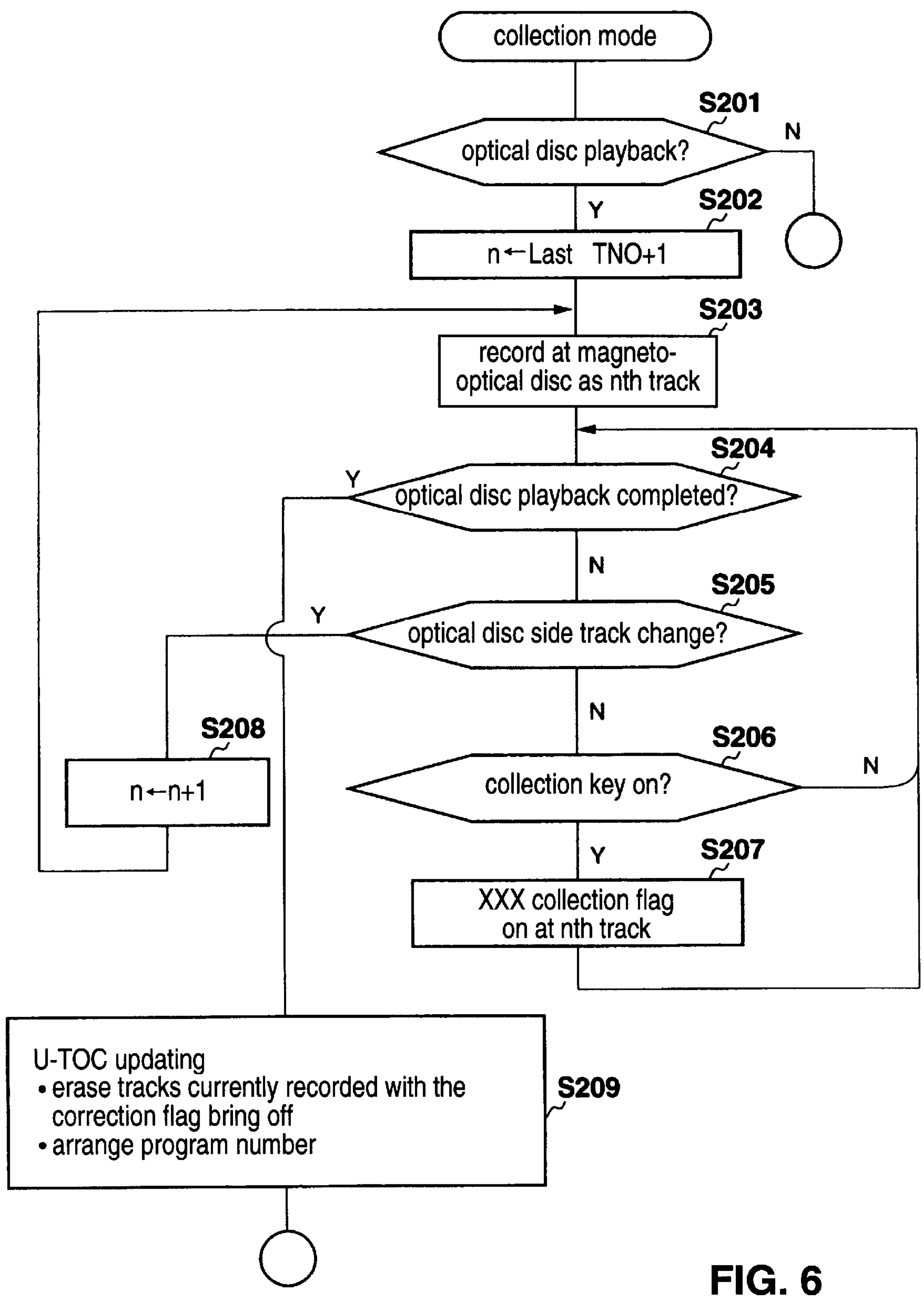
FIG. 6 is a flowchart expressing an editing and erasing process at the time of a collection mode designation for the first embodiment.

The process for the system controller 11 for realizing such a collection mode operation is shown in FIG. 5 and FIG. 6.

FIG. 5 shows the process relating to the operation for going into collection mode and the process relating to the operation for returning from collection mode to normal mode.

The user presses the collection key (S101) during a period when recording relating to the magneto-optical disc 1 is not being carried out (or a period when the optical disc 30 is not being played-back).

As a result, the system controller 11 puts the collection mode on (S102–S103) if collection mode is not the current mode.

On the other hand, if the current mode is the collection mode, the collection mode is turned off (S102–S104).

In this way, the user can set and cancel the collection mode by operating the collection key.

It is preferable to provide a light-emitting diode (hereinafter referred to as "LED") etc. for recognizing the collection mode, so that this LED is made to illuminate during periods when the collection mode is selected.

Further, in this example, the mode is set using the collection key, but other independent mode changeover operation sections may be of course provided.

The process in the collection mode is shown in FIG. 6.

When in collection mode, the system controller 11 advances the process from step S201 to step S202 in response to the optical disc 30 being played-back. First, a variable n is set as a value for which the value "1" is added to the data for the last program number (last TNO) at the U-TOC sector 0 at this time. This is to say that the variable n is the first program number of the programs recorded to the magneto-optical disc on this occasion and if the installed magneto-optical disc is a virgin disc, the variable n is taken to be 1 in step S202. Further, if, at this time, the magneto-optical disc 1 is in the recorded state (already recorded with two programs) such as shown in FIG. 4E, the variable is made to be n=3 in step S202.

Next, the system controller 11 carries out a process in step S203 for recording audio data played-back from the optical disc 30 as an nth program on the magneto-optical disc 1.

During the recording of this nth program, the system controller 11 monitors if there is a change in program number of the optical disc 30 or whether the collection key has been pressed (S205, S206).

The system controller 11 can detect changes in the program number of the optical disc 30 from sub-code information obtained from the optical disc 30.

When the collection key is pressed while the nth program is being recorded, the collection flag is put to on (S206, S207) in correspondence with this nth program.

Further, when there is a change in program number of the optical disc 30, i.e. when playback from the optical disc 30 is shifted from one program to the next program, the system controller 11 controls the process so as to increment the variable n (S205, S208), then return to step S203, and record audio data played-back from the optical disc 30 as the nth program, i.e. the next program on the magneto-optical disc.

The operation for, for example, FIG. 4A to FIG. 4D is executed using the process described up to this point.

When playback of the optical disc 30 is completed, the process proceeds from step S204 to step S209 and a process for updating the U-TOC is carried out.

This is to say that, with regards to the program recorded on this occasion, tracks for which the collection flag is off are erased and the program numbers of the remaining programs are then put closely in order by sequentially arranging the program numbers.

As a result of this, the recorded state of the magneto-optical disc 1 goes, for example, from the state in FIG. 4D to the state in FIG. 4E, with only the programs in the user's favor being recorded.

Updating of the U-TOC is carried out within the buffer memory 13, with the U-TOC data then being actually re-written on the magneto-optical disc 1 at a prescribed time afterwards, such as when the power supply is turned-off.

4. Example of a second recording method adoptable in the embodiment.

Next, an example of a second recording method is described using FIG. 7A to FIG. 7F.

In this example also, if the collection key is pressed while the optical disc 30 is being played-back, the program designated by this collection key remains recorded as a program on the magneto-optical disc 1.

For example, an example of the operation of the collection mode when program number 1 (track #1) to program number 4 (track #4) are played back from a single optical disc is given in FIG. 7A to FIG. 7F.

First, the magneto-optical disc 1 is taken as a virgin disc where no programs are recorded as shown in FIG. 7A.

The user then performs a playback operation of the optical disc and audio playback data is obtained from the optical disc 30 as the program number #1. If the mode at this time is the collection mode, the system controller 11 then automatically executes the recording operation for the magneto-optical disc 1 so as to follow the playing-back of the optical disc 30, as in the above first example operation.

Because of this, at the time when the playing-back of the program #1 is completed at the optical disc 30, audio data is recorded at the magneto-optical disc 1 as the first program TK1 as shown in FIG. 7B.

Further, during the recording of the program, the system controller 11 monitors whether or not there has been a collection key operation at the operation part 19 and, when there has been the operation, performs a process to put the collection flag corresponding to the program in recording "on".

If the user does not operate the collection key while listening to the program number #1 of the optical disc 30, the collection flag set at the internal register etc. by the system controller 11 so as to correspond with the first program TK1 on the magneto-optical disc 1 remains in "L" (off) as shown in FIG. 4B.

When playback of the optical disc 30 proceeds to program number #2, the system controller 11 checks the collection flag for the first program TK1. If the collection flag is off, as shown in FIG. 7B, the first program TK1 is erased at this time and the region that was recorded with the first program TK1 is again inserted to the head of the free area on the U-TOC.

Next, program number #2 is played-back from the optical disc 30. However, because this program number #2 is also recorded at a free-area on the magneto-optical disc 1, this program number #2 is actually over written at the region previously recorded with the program number #1.

When the playback of program number #2 is completed, the program number #2 is then recorded as the first track TK1 as shown in FIG. 7C. If the user then operates the collection key while program number #2 is being played-back, the system controller 11 sets the collection flag corresponding to the first track TK1 to "H" (on).

Next, program number #3 is played back from the optical disc 30 but at this time, on the magneto-optical disc, the collection flag for the first program number TK1 is on. The recording of program number #3 is therefore carried out as the second program TK2 at a region following the first program TK1. If the collection key is pressed while program number #3 is being played-back, the collection flag also goes on with regards to the second program TK2. This second program TK2 is then left as shown in FIG. 7D and the following program, program number #4 is recorded at a position following from the second program TK2 as the third program TK3.

If the collection key is not pressed while program number #4 is being played-back, the collection flag for the third program TK3 is off when program number #4 is finished as shown in FIG. 7E. At this time, when the playing-back of the optical disc 30 is completed, the system controller 11 erases the third program TK3 and the operation is completed with the region on which the third program TK3 was recorded being inserted at the head of the free area on the U-TOC.

In other words, in this example also, if the user is in favor with a program while the optical disc 30 is being played-back and presses the collection key, this program remains recorded on the magneto-optical disc 1.

Figure 8:
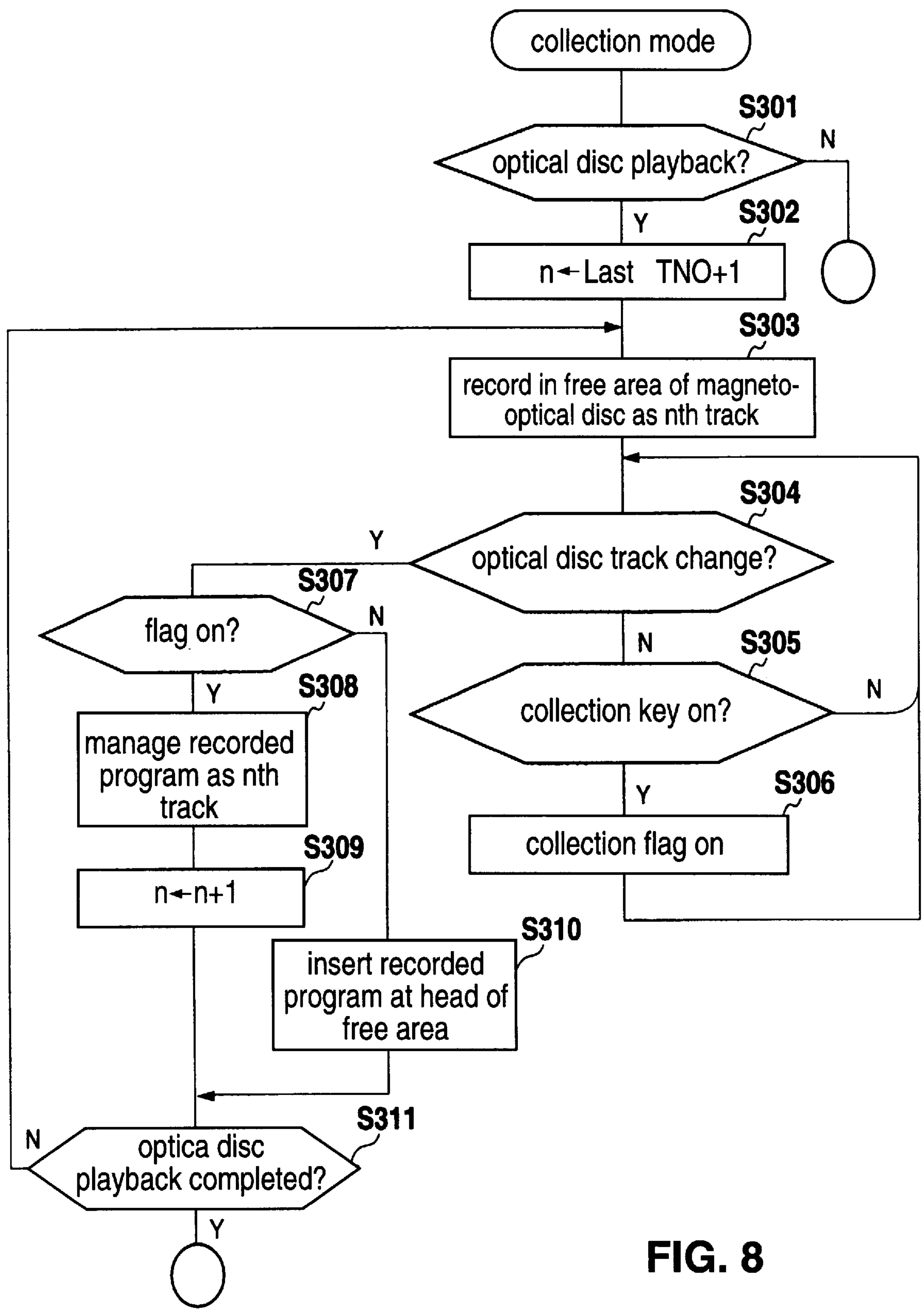
FIG. 8 is a flowchart expressing an editing and erasing process at the time of a collection mode designation for a second embodiment.

The process for the system controller 11 for achieving this kind of collection mode operation is shown in FIG. 8. The process relating to the operation for going into collection mode and the process relating to the operation for returning to normal mode from collection mode are the same as for FIG. 5.

When in collection mode, the system controller 11 proceeds from step S301 of the process of FIG. 8 to step S302 in response to the playback operation of the optical disc 30. The system controller then sets the first program number to be recorded as the variable n, which is in turn taken to be the data for the last program number (last TNO) in the U-TOC sector 0 at this time with the value "1" added, in the same way as for the case in FIG. 6.

Next, in step S303, the system controller 11 carries out a process to record audio data played-back from the optical disc 30 on the magneto-optical disc 1 as the nth program.

While this nth program is being recorded, the system controller 11 monitors if there has been a program number change on the optical disc 30 or if the collection key has been pressed (S304, S305).

Further, if the collection key is pressed while the nth program is being recorded, the collection flag is put on (S305, S306) so as to correspond with this nth program.

If the program number is changed on the optical disc 30, i.e. if playback from the optical disc 30 is shifted to the next program, the process for the system controller 11 proceeds to step S307 and a collection flag is checked for the nth program at this time, namely the program just having been recorded.

If the collection flag is on, this program is managed on the U-TOC as the nth program, the variable n is incremented (S308, S309) and the process returns to step S303 to carry out control so that he audio playback data inputted in succession from the optical disc 30 is recorded at the free area of the magneto-optical disc 1 as the nth program i.e. the next program.

On the other hand, when it is determined in step S307 that the collection flag is off, the nth program, i.e. the program just having been recorded is treated as being erased on the U-TOC, and the region being recorded is inserted at the head of the free-area (S310). This is to say that the state is made to be a state where recording is not carried-out. The variable n is then not incremented and the process returns to step S303 so that audio playback data inputted in succession from the optical disc 30 is controlled to be recorded at the free area of the magneto-optical disc 1 as the nth program, i.e. the program following the final program currently being recorded on the magneto-optical disc 1.

The operation in, for example, FIG. 7A to FIG. 7F can be executed using the process described thus far.

When playback of the optical disc 30 is completed, the process ends from the step S311. In this flowchart, at the time of the completion, the decision in step S304 is made as there has been a program change, and the looping is finished at step S311 so as to complete the process after the execution in step S307 to S310.

By the process described above, just the programs in the user's favor are recorded on the magneto-optical disc 1 as shown in FIG. 7F by using this process.

After completion, the U-TOC data is actually re-written on the magneto-optical disc at a prescribed time such as when the power supply is turned-off.

5. Structure and operation of magneto-optical recording device as a second embodiment.

A second embodiment is shown in FIG. 9. The equipment in this embodiment only has the portion for the magneto-optical disc recording device. Portions in the block diagram in FIG. 9 that have the same function as portions in FIG. 1 are given the same numerals and their detailed description is omitted.

The magneto-optical disc recording/playback portion of FIG. 9 differs from that of FIG. 1 in that a digital input terminal 23, digital audio interface 21 and audio level detector 22 are provided and a level meter 14*a* is provided within the second encoder/decoder 14.

The digital input terminal 23 is a terminal for a digital audio interface with external equipment. Data inputted from the digital input terminal 23 is provided to the digital audio interface 21.

When an external equipment is connected to the digital audio interface, audio information played-back from external optical disc players or magneto-optical disc players is provided as digital data without modification. At the same time, control data SS is transmitted to the input terminal which data includes sub-code information etc. for the playback in a prescribed format.

At the digital audio interface 21, audio data (44.1 kHz sampling, 16-bit quantization) is extracted from the supplied data and provided to the second encoder/decoder 14 as recording data.

Further, control data SS such as the sub-code information is extracted and provided to the system controller 11. For example, U-(user) bit data and C-(control) bit data are transmitted from an optical disc player etc. the control data SS.

The U-bit data includes sub-code data known as each of the data Q, R, S, T, U, V and W, and the. C-bit data includes category data for discriminating recording medium, sampling frequency data, clock data and optical system data.

The system controller 11 then controls the various recording operations using the necessary data from the control data SS as described above.

When audio data is provided by the digital audio interface 21, the level of the transmitted audio data is detected by an audio level detector 22. Detected level information SLV1 is then provided to the system controller 11.

When an analog audio signal is inputted from the analog input terminal 17, audio signal level information SLV2 is detected by the level meter 14*a* and supplied to the system controller 11.

The system controller 11 then detects whether or not the audio data inputted at the second decoder/encoder 14 is in zero level from the level information SLV1 and SLV2 and from a detection is also possible as to whether or not the audio signal on the source-side is given as being between programs (i.e. undergoing a track change).

The collection mode operation can be executed in this embodiment also by applying the aforementioned first and second operation examples.

In this case, if the device of this embodiment is connected to, for example, an optical disc auto-changer capable of loading and selectively playing back a large number of optical discs via a digital audio interface 21 so that, when the optical disc auto-changer plays back an optical disc, the audio playback data is then inputted to the device via the digital audio interface 21, the user can obtain a magneto-optical disc 1 recorded only with programs in the user's favor as described in the first embodiment by pressing the collection key at the operation part 19 when a program in favor with the user is played back.

In this case, the system controller 11 receives information for program number changes on the playback side as U-bit data which is processed without any problem.

The same operation is also possible even when a connection is made with external equipment using an analog audio line. However, in this case, the system controller 11 cannot obtain information for program number changes on the playback side. In this case, however, the program number change can be well determined by monitoring the level information SLV2 and recognizing zero level thereof being continuous for a certain period of time (for example, about 2 to 5 seconds).

6. Structure and operation of a magneto-optical recording device as a third embodiment.

Figure 10:
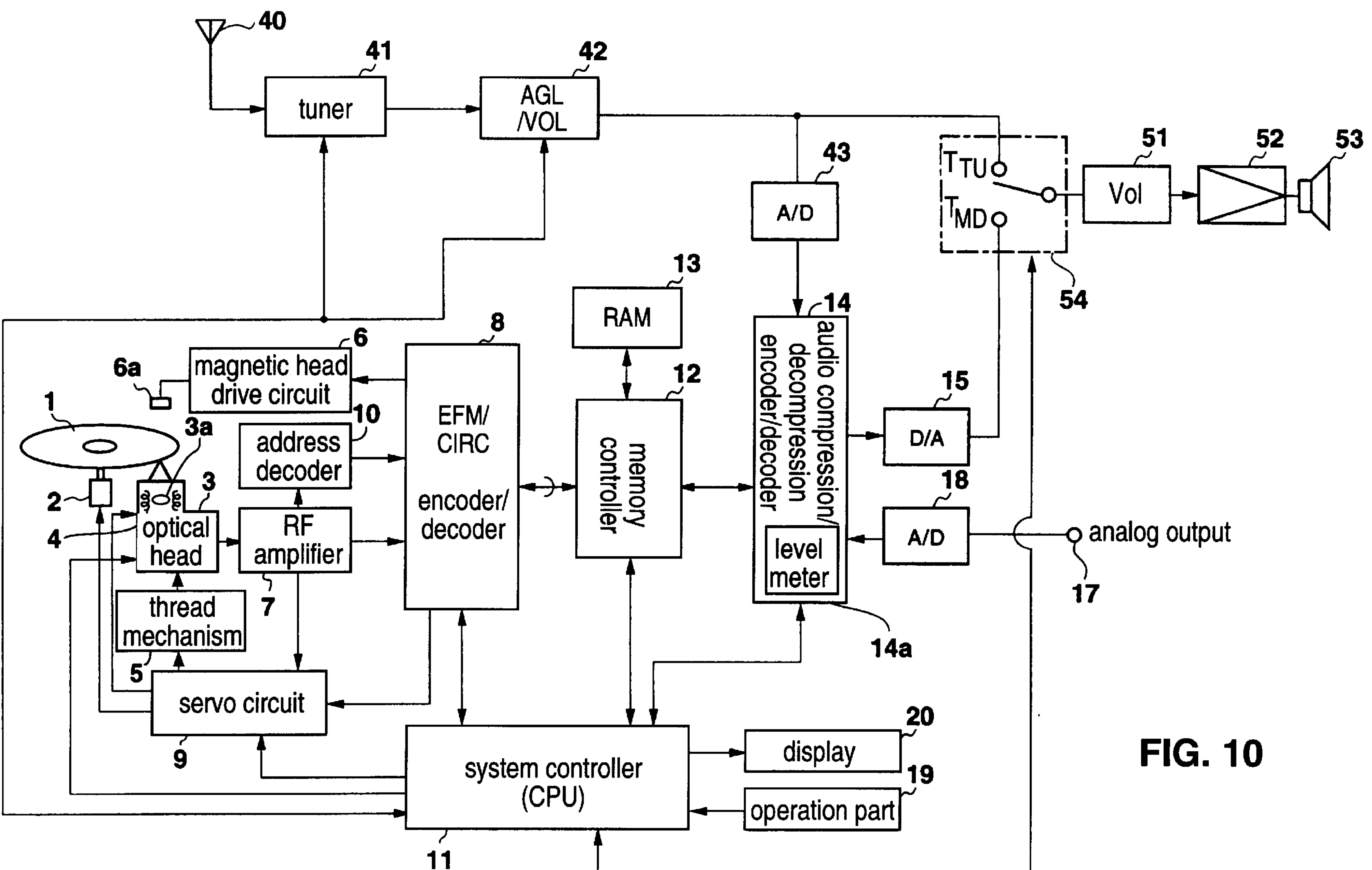
FIG. 10 shows a block diagram showing the whole of a third embodiment of the present invention.

A third embodiment is shown in FIG. 10. In this embodiment the device has a receiver device such as a radio tuner in place of the optical disc player etc. in the magneto-optical disc recording device of FIG. 1. Portions of the block diagram in FIG. 10 which are the same as portions of FIG. 1 are given the same numerals and their detailed description is omitted.

Signals received at an antenna 40 are demodulated at a tuner 41 and amplified by a prescribed amount at an Automatic Gain Control (hereinafter referred to as "AGC")/volume control 42, before being provided to a terminal TTU of a switching circuit 54. When in radio-receiving mode, a received audio signal is outputted from the speaker 53 as a result of the system controller 11 exerting control to connect the terminal TTU of the switching circuit 54 to the volume control circuit 51.

The received audio signal is also put into the form of digital data at an analog to digital converter 43 and provided to the second encoder/decoder 14.

Namely, this embodiment is configured in such a manner that an audio signal in a received radio wave can be air-check-recorded at the magneto-optical disc 1.

The collection mode operation may also be executed in this embodiment by applying the aforementioned first and second operation examples.

In the collection mode in this case, the system controller automatically records the received audio signal on the magneto-optical disc 1 while the radio signal is being received.

Thus, the user can obtain a magneto-optical disc 1 recorded only with audio signal in the user's favor in the same way as for the first embodiment by the user pressing the collection key at the operation part 19 when a program is by chance in the user's favor.

In order to discern an interspace between programs in this case, if the broadcast is, for example, an FM-multiplexed broadcast etc. not only composed of audio data but also having various kinds of control data superimposed, the system controller 11 is capable of recognizing the change points of the programs recorded on the magneto-optical disc 1 from this data. Further, in the case of normal FM/AM broadcasts, the level information SLV2 is monitored and a program change point can be determined from a zero level being continuous for a certain period of time (for example, 2 to 5 seconds).

This can also be applied to broadcasts other than radio broadcasts, such as television broadcasts and various satellite broadcasts etc.

7. Examples of various modifications.

In addition to various embodiments having been described in the above, a variety of modifications may be considered for the present invention.

For example, descriptions have been given only of embodiments where a magneto-optical disc has been taken as the recording medium, but the present invention can also be applied to recording devices employing tape shaped recording media such as Digital Audio Tape etc., or solid-state memories etc.

Further, the present invention is not just limited to the recording of audio data and may also be applied to the recording of data for computer-use such as image data or character data.

Moreover, in this embodiment, the determination as to whether or not a program is to be remained on the magneto-optical disc 1 is to be based on an operation of the user collection key, but alternatives may be considered. For example, in the embodiment in FIG. 1, the number of times each of the programs is played back at the optical disc player may be counted and stored, and programs being frequently played-back are determined to be valid and are remained as recorded programs on the magneto-optical disc 1.

As described in the above, the recording device of the present invention is provided with an information unit determining means for discriminating changes in information unit in inputted information and uses a recording controller means for automatically recording the inputted information on a recording medium with a recording means in accordance with the information inputted. A valid or invalid determining means is then provided for determining whether this information unit is valid or invalid as the information unit being recorded. Further, a recording information unit selecting and processing means performs a prescribed process on the recorded information recorded on the recording medium by the recording means so that only the information units determined to be valid by the valid or invalid determining means are allowed to remain on the recording medium as recorded data.

As a result, the user is able to obtain, for example, only the information units in the user's favor being remained on the recording medium without being aware of the recording operation, and to produce a favorite disc effortlessly.

What is claimed is:

1. A dubbing system for dubbing information reproduced from a first recording medium at a second recording medium, comprising:

an information unit detector for detecting changes in information units of information reproduced from said first recording medium;

a recording head for recording on said second recording medium management information for managing information reproduced from said first recording medium and information recorded at said second recording medium;

an input part for registering a desired information unit to be recorded on the program region to the management region of the second recording medium, if a user operates the input part during the reproducing operation of the first recording medium; and a management information editor for editing the management information in such a manner that only information units which are registered by the input part remain on the program region of the second recording medium and information units which are not registered by the user input part are managed as a recordable area of the second recording medium, whereby management information edited by the management information editor is recorded at the management region of the second recording medium.

2. A dubbing system for dubbing information reproduced from a first recording medium at a second recording medium, comprising:

information unit detecting means for detecting changes in information units of information reproduced from the first recording medium;

recording means for recording information units of information reproduced from the first recording medium and management information for managing the information units on the program region and management region of the second recording medium respectively;

input means for registering a desired information unit to the management region of the second recording medium to be recorded on the program region, if a user operates the input means during the reproducing operation of the first recording medium; and management information editing means for editing the management information in such a manner that only information units which are registered by the input means remain on the program region of the second recording medium and information units which are not registered by the user input means are managed as a recordable area of the second recording medium, whereby management information edited by the management information editing means is recorded at the management region of the second recording medium.

3. A dubbing system according to claim 2, wherein said information unit detection means detects changes in said information units of said reproduced information on the basis of a control signal inputted together with said information reproduced from said first recording medium.

4. A dubbing system according to claim 2, wherein said information unit detection means detects changes in said information units of said reproduced information in accordance with a condition of said information reproduced from said first recording medium.

5. A dubbing system according to claim 2, further comprising recording control means for automatically controlling the recording of said information reproduced from said first recording medium at said second recording medium.

6. A dubbing system according to claim 2, wherein said management information editing means manages regions recorded with said information units which are not registered by the user input means as being a recordable region and edits program numbers of said information units which are registered by the user input means.

7. A dubbing system according to claim 2, further comprising a recording control means for controlling said recording means in such a manner that said program region recorded with an information unit which is not registered by the user input means is overwritten with a following information unit.

8. A dubbing system for dubbing information reproduced from a first recording medium at a second recording medium, comprising:

information unit detecting means for detecting changes in information units of information reproduced from the first recording medium;

recording means for recording information units of information reproduced from the first recording medium and management information for managing the information units on the program region and management region of the second recording medium respectively;

input means for registering a desired information unit to be recorded on the program region to the management region of the second recording medium, if a user operates the input means during the reproducing operation of the first recording medium; and management information editing means for editing the management information in such a manner that only information units which are registered by the input means remain on the program region of the second recording medium and information units which are not registered by the user input means are managed as a recordable area of the second recording medium;

a recording control means for controlling said recording means in such a manner that said program region recorded with an information unit which is not registered by the user input means is overwritten with a following information unit; and whereby management information edited by the management information editing means is recorded at the management region of the second recording medium and wherein said management information editing means manages regions recorded with said information units which are not registered by the user input means as being a recordable region and edits program numbers of said information units which are registered by the user input means.

9. A method of dubbing information reproduced from a first recording medium at a second recording medium, comprising the steps of:

detecting changes in information units of information reproduced from the first recording medium;

recording information units of information reproduced from the first recording medium and management information for managing the information units on the program region and management region of the second recording medium respectively;

registering a desired information unit to be recorded on the program region to the management region of the second recording medium, if a user performs the registering step during the reproducing operation of the first recording medium; and editing the management information in such a manner that only information units which are registered remain on the program region of the second recording medium and information units which are not registered are managed as a recordable area of the second recording medium, whereby management information edited by the management information editing means is recorded at the management region of the second recording medium.

10. A method for dubbing information reproduced from a first recording medium at a second recording medium, comprising the steps of:

detecting changes in information units of information reproduced from said first recording medium;

recording on said second recording medium management information for managing information reproduced from said first recording medium and information recorded at said second recording medium;

registering a desired information unit to be recorded on the program region to the management region of the second recording medium, if a user performs the registering step during the reproducing operation of the first recording medium; and editing the management information in such a manner that only information units which are registered remain on the program region of the second recording medium and information units which are not registered are managed as recordable areas of the second recording medium, whereby management information edited by the management information editor is recorded at the management region of the second recording medium.

* * * * *